Sept. 24, 1968  K. A. B. JARREBY  3,402,815
APPARATUSES FOR THE CLEANING OF CORN AND THE LIKE
Filed Sept. 14, 1965  3 Sheets-Sheet 1

Karl Axel Bertil Jarreby
INVENTOR
BY Wenderoth, Lind
and Ponack, ATTORNEYS

Sept. 24, 1968   K. A. B. JARREBY   3,402,815
APPARATUSES FOR THE CLEANING OF CORN AND THE LIKE
Filed Sept. 14, 1965   3 Sheets-Sheet 3

Karl Axel Berti Jarreby
INVENTOR
BY Wendroth, Lind
and Ponack ATTORNEYS

United States Patent Office 3,402,815
Patented Sept. 24, 1968

3,402,815
APPARATUSES FOR THE CLEANING OF
CORN AND THE LIKE
Karl Axel Bertil Jarreby, Falkenberg, Sweden, assignor to Skandinaviska Apparatindustri AB, Falkenberg, Sweden, a corporation of Sweden
Filed Sept. 14, 1965, Ser. No. 487,167
Claims priority, application Sweden, Oct. 1, 1964, 11,784/64
16 Claims. (Cl. 209—139)

ABSTRACT OF THE DISCLOSURE

An apparatus for cleaning granular material, such as corn, wherein a tubular housing is provided having a lower open end. A conical spreading disk is arranged with its apex upwards at the lower open end. Means for feeding granular material centrally down on said conical spreading disk are provided and a source of negative air pressure is connected to the housing at its upper end to cause an air stream to meet and clean the granular material adjacent the disk and bring along upwardly foreign light bodies contained in the granular material. Means such as flanges and openings are provided upon said housing and disk for producing a swirling current of air above said spreading disk in the housing.

---

For cleaning corn there are nowadays used two different types of cleaning apparatuses, so-called corn aspirators, i.e., an apparatus provided with a fixed conical spreader disk and another one provided with so-called turbine spreaders. The first type does not give sufficient spreading efficiency of the corn and the second type which may give a somewhat higher spreader efficiency has the drawback that the operation of the turbine driven by means of the air through the apparatus often is interrupted and thus constitutes a moment of unsafety for the continuous operation of the aspirator.

A first object of this invention is to remedy the above recited drawbacks. The invention relates more particularly to aspirators of the kind in which the corn is fed centrally down over a conical spreader disk and meets an air stream which brings along light foreign bodies contained in the corn, said disk with its top turn upwards arranged at the lower open end of a tubular housing the latter being at its upper end connected to a cyclone separator or a similar separator via the negative pressure side of a blower. The spreader disk is provided with openings to be passed through by the jets of cleaning air. The main feature of the invention is to be seen therein that the aspirator is provided with means for producing a typhoon-like current of air above the disk.

According to a preferred embodiment of the invention the spreader disk is provided with guides adapted to direct the air streams through the disk in the same direction obliquely upwards towards the corn or the like sliding down on the disk in the direction towards the wall of the housing facing said disk, and on the inside of the housing which with advantage is shaped as a funnel there are arranged guides, e.g., guiding flanges and/or guiding fins adapted to force the air sucked out from the upper end of the housing along a helical path through the housing at least at the lower portion of the same. Due to these air jets passing through the disk the descending corn is spread very effectively and at the same time the cleaning effect is increased. There are no rotating parts during operation in the aspirator proper and no operation disturbances have to be encountered. The aspirator will— due to the elimination of movable parts—be cheap in manufacture. Due to the fact that the air jets are directed obliquely and in one and the same direction, a helical, typhoon-like air stream will pass along the inside of the housing which preferably is conical. This helical air stream has turned out to have the advantageous effect that foreign bodies contained in the corn such foreign bodies comprising, e.g., straw with so-called knees will be brought along by the air stream and be separated in the cyclone separator connected to the cleaner proper. This helical air stream may be considerably reinforced by providing the housing on its inside with guiding flanges which direct the air stream helically upwards. The guiding flanges are preferably arranged on a frame outside the spreading disk serving as an air directing device. It is important that the helical air streams occur exactly here where the most important cleaning of the corn is obtained.

According to a preferred embodiment, this frame at the lower end of the housing is provided with apertures and laterally directed impressings or the like which direct the air, coming from the outside, in helical streams into the slot between the frame and the spreading disk. The cleaning effect of such a device will be particularly good.

According to a further embodiment of the invention the spreading disk is shaped with an internal cavity which can be connected to a source of compressed air. The source of compressed air could with advantage comprise the pressure side of the fan or blower of a cyclone separator which is connected to the cleaner proper.

In the following the invention will be described with reference to the accompanying drawings. In the drawings.

Figure 1:
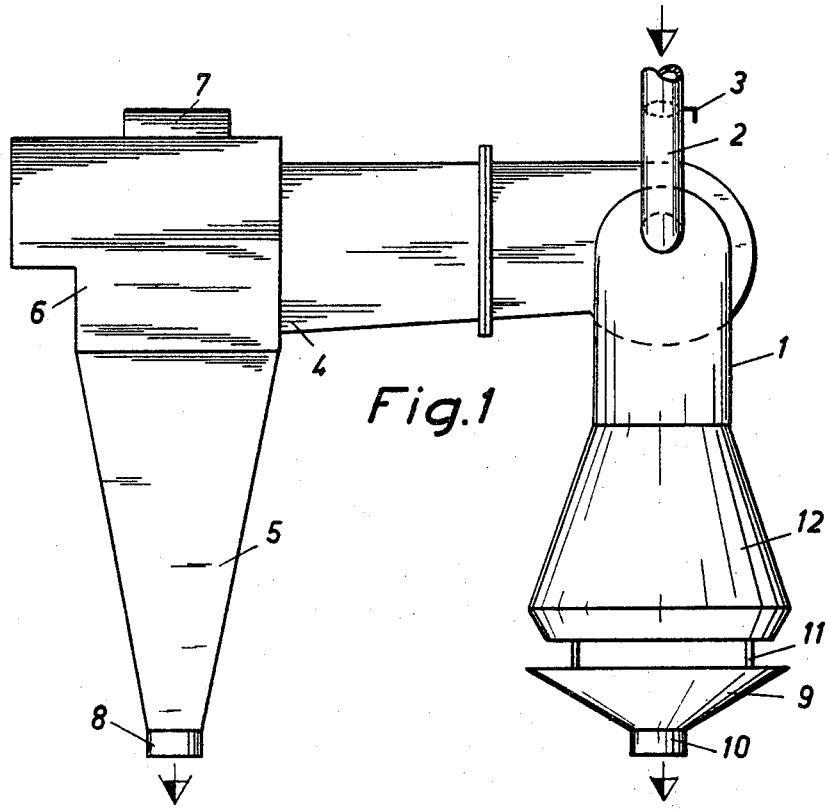
FIG. 1 is a side elevation of an aspirator according to the invention comprising the cleaning apparatus and a cyclone separator connected to the same.
Figures 3, 5:
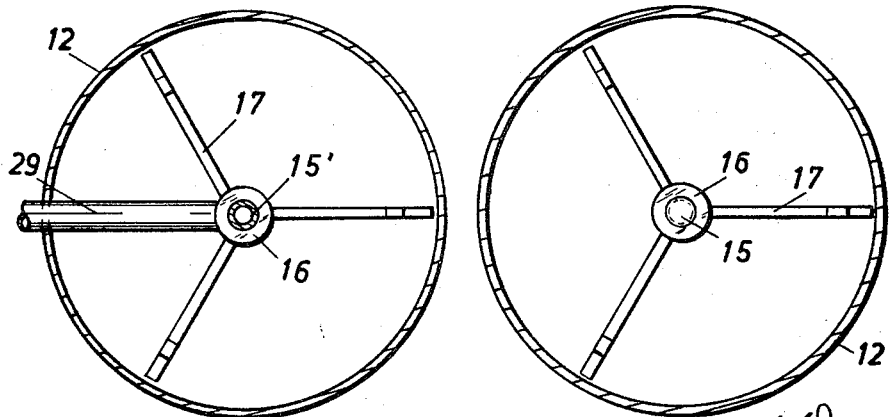
FIG. 3 shows a horizontal longitudinal section through the cleaning apparatus on the line III—III in FIG. 2.
FIG. 5 shows a horizontal cross section on the line V—V in FIG. 4.

In FIG. 1 there is shown partly diagrammatically an aspirator according to the invention for the cleaning of corn. The cleaning apparatus proper 1 is at its upper end provided with a feeding conduit 2 for corn, and in this conduit there is inserted a damper 3 for controlling the quantity of fed corn. The cleaning apparatus 1 is connected via an intermediate portion 4 to a cyclone separator 5 with a fan 6 and an outlet 7 for the aspirator air at the upper end and an outlet 8 for the separated waste at the lower end. At the lower end of the cleaning apparatus 1 there is arranged an outlet funnel 9 with an exhaust 10 for the cleaned corn. The funnel 9 is by means of vertical rods 11 attached to the lower end of the housing 12 of the apparatus.

Figure 2:
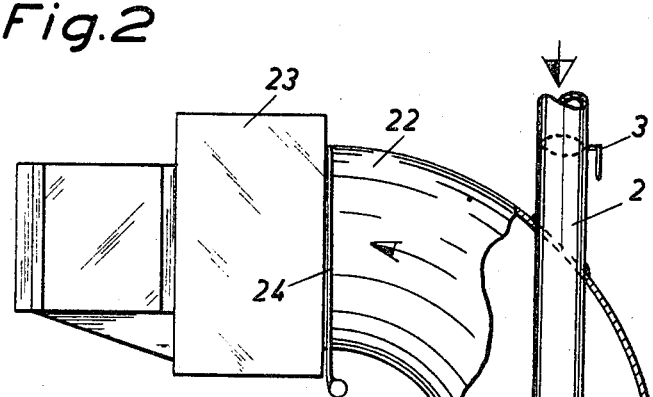
FIG. 2 is a side elevation of the cleaning apparatus shown in a partial longitudinal section.
Figure 11:
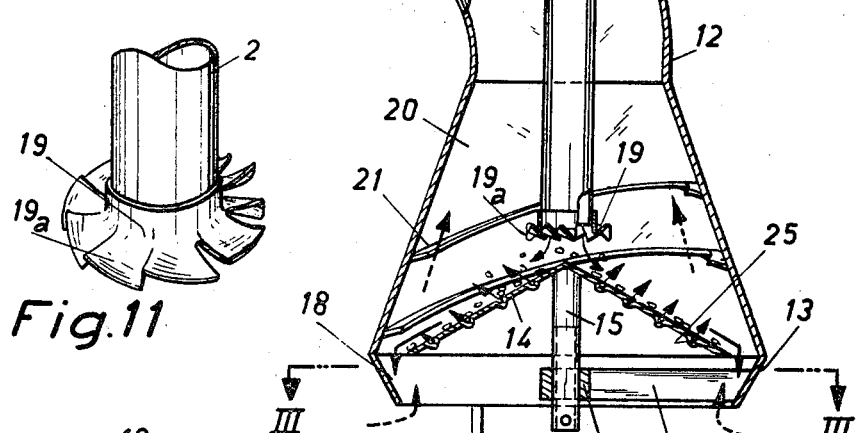
FIG. 11 shows on a larger scale a perspective view of the lower end of the feeding conduit for the corn.

In the interior of the housing 12 of the apparatus (FIG. 2) which at its lower end is shaped with an inwardly directed frame 13 there is arranged a conical spreading disk 14. The disk 14 is provided with a central post 15 having external threads at the lower end and is adapted to be screwed upwards or downwards in a central hub 16 having internal threads, said hub being arranged on a bar 17 extending radially inwards from the frame 13. By means of a lifting or lowering of the spreading disk the width of the annular slot 18 between the frame 13 and the periphery of the disk 14 is increased or decreased, respectively. It is hereby rendered possible to alter the adjustment of the spreading disk in dependence of the kind of corn to be cleaned. The feeding conduit 2 debouches just above the apex of the spreading disc. The feeding conduit is at its lower end provided with a fixed collar 19. The latter is provided with radial slits forming tongues 19a which are bent in the same direction like the rotor of a fan. Between the feeding conduit 2 and the housing 12 there is formed an annular passage 20 which uniformly tapers upwards. In this passage there are at the inside of the housing 12 attached guide flanges 21 for the air drum 22 extending up to the cyclone separator 5. According to FIG. 2 a fan 23 is mounted in this drum 22 and in front of the inlet to the fan 23 there is arranged an air damper 24 for the control of the air stream emerging from the cleaning apparatus.

Figure 8:
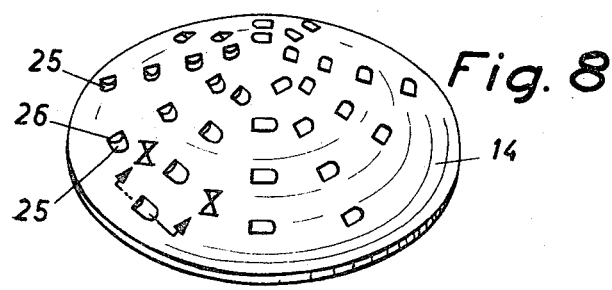
FIG. 8 is a perspective view obliquely from above of the spreading disk of the apparatus.
Figure 10:
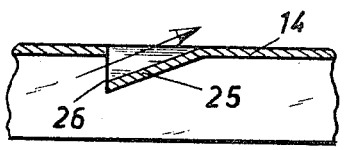
FIG. 10 shows on the same scale as FIG. 9 a vertical section through the disk on the line X—X in FIG. 8.
Figure 9:
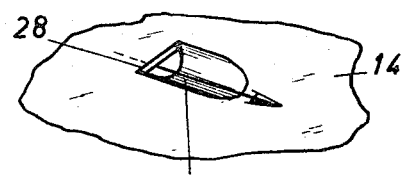
FIG. 9 shows on an enlarged scale from above one of the openings in said disk.

The spreading disk 14 is provided with obliquely directed impressings 25 which is shown more clearly in FIGS. 8–10. The impressings 25 are directed substantially peripheral with an air inlet 26 at one end. The impressings guide the air sucked in at the lower border of the frame 13 in jets towards the housing 12 in such a way that helical air streams will pass up through the passage 20 where the air is given a helical rotation up through the drum 22.

The air streams through the openings 26 (FIGS. 2 and 10) hit the corn sliding down on the outside of the spreading disk 14 from below and loosen it in a way which is very favourable for the cleaning. When the corn slides over the border of the spreading disk 14, it is hit by the air streams passing through the annular slot 18 and these air streams bring along all foreign bodies contained in the corn. The cleaned corn leaves the apparatus through the outlet 10 and waste is brought along with the air streams to the cyclone separator 5. Here, the waste is forced through the outlet 8 and the conveying air out of the outlet 7.

Also the oblique tongues 19a force the air streams to turn helically round the feeding conduit 2 upwards in the passage. Furthermore, the collar prevents corn rebounding against the disk 14 to jump up into the passage 20 where it would be fed with the air streams together with the waste and be lost.

Figure 4:
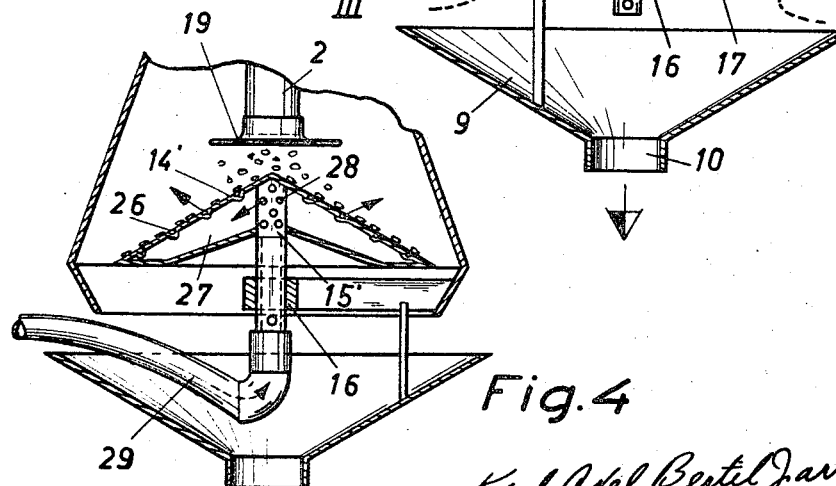
FIG. 4 shows a vertical section through the cleaning apparatus according to another embodiment.

According to the embodiment shown in FIG. 4 the spreading disk 14' is provided with an internal cavity 27. The post 15' is in this case tube-shaped and debouches with holes 28 in the cavity 27. The tube-shaped post 15' is connected through a conduit 29 to the pressure side of the fan 6 or 23 or any other source of air pressure. It is hereby obtained a positive pressure in the interior of the spreader disk and the air jets pressed out of the openings 26 hit the corn with force from below. These air jets do not only loosen the corn but contribute also to the cleaning of the same. So as to prevent the corn from penetrating down through the openings 26 and to fill the cavity 27, the damper 3 should be coupled to the fan 6 or 23, respectively in such a way that the damper is opened only after the start of the fan in question and the required positive pressure has been built up in the cavity 27. An air filter is preferably mounted in the conduit 29.

Figure 6:
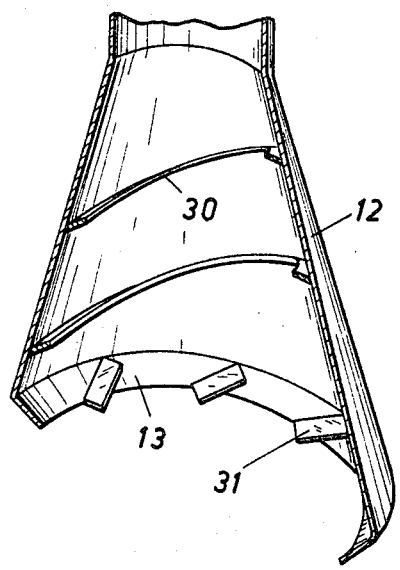
FIGS. 6 and 7 show vertical sections of the housing of the cleaning apparatus according to two different embodiments.

As shown in FIG. 6 the housing 12 may on the inside be provided with a helical guiding rail 30. The frame 13 is here provided with guiding flanges 31. The guiding rail 30 as well as the guiding flanges 31 contribute to the creation of helical air streams up through the passage 20 to the drum 22.

Figure 7:
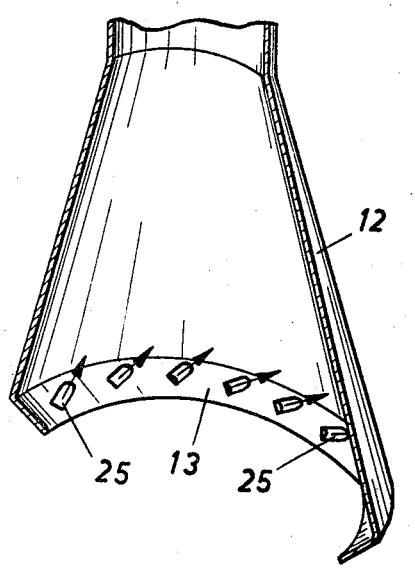

According to FIG. 7 the frame 13 is provided with impressings 25 similar to the ones shown in FIGS. 8–10. Also these impressings guide the air streams which pass through openings in the frame 13 and direct them helically and obliquely through the annular slot 18. Also these helical air streams contribute effectively to the good cleaning effect. The housing is preferably provided with another row of openings, parallel with the row of openings 25 shown in FIG. 7 and arranged in the wall of the housing above the frame 13.

The invention has been described in the aforegoing for purposes of illustration only and is not intended to be limited by this description or otherwise except as defined in the appended claims. Many constructive modifications could be carried out with regard to the different parts of the aspirator without departure from the scope of the invention. Thus, it is possible to combine the different embodiments shown in the drawings and described in the aforegoing. It is possible to use another pressure source than the above mentioned fans 6 and 23. Also the impressings 25 (FIG. 7) could be fed by means of compressed air. In such a case it is preferable to arrange an annular channel outside the frame 13 and connect this channel to the source of pressure in question, the impressings 25 debouching in said channel. The aspirator may be used for cleaning of other granular materials than corn.

What I claim is:

1. An apparatus for cleaning granular material, such as corn, comprising a tubular housing having a lower open end, a conical spreading disk arranged with its apex upwards at said lower open end, means for feeding granular material centrally down on said conical spreading disk, a source of negative air pressure connected to said housing at its upper end to cause an upwardly directed air stream in said housing to meet and clean said granular material adjacent said disk and bring along upwardly foreign light bodies contained in said granular material and means upon said housing and disk comprising at least one opening through said disk for producing a swirling current of air above said spreading disk in said housing.

2. An apparatus as set forth in claim 1 wherein said means upon said housing for producing a swirling current of air comprises oblique flanges at the interior of said housing.

3. An apparatus as set forth in claim 1 wherein said means for feeding granular material is a conduit having a damper operated in synchronism with said source of negative air pressure.

4. An apparatus as set forth in claim 1 wherein said means for feeding a granular material comprises a conduit having at its lower end a collar fixed to said conduit having tongues to guide the air stream in said housing helically upwardly between said conduit and said tubular housing.

5. An apparatus as set forth in claim 1 wherein said disk has openings therein and peripheral impressions located adjacent said openings to direct the air passing through said openings to form a swirling current of air above said disk.

6. An apparatus as set forth in claim 1 wherein said spreading disk has openings and guiding means to direct air streams through said disk obliquely upwards and towards said granular material sliding down on said disk.

7. An apparatus as set forth in claim 6 wherein said disk has an internal cavity under positive air pressure.

8. An apparatus as set forth in claim 6 wherein said housing is shaped as a funnel and helical guiding means are provided at the inside of said housing for the air passing through said housing.

9. An apparatus as set forth in claim 6 wherein said housing has oblique openings supplied by air under pressure.

10. An apparatus as set forth in claim 6 wherein said housing has its upper end connected to a cyclone separator.

11. An apparatus as set forth in claim 10, wherein said disk has an internal cavity connected to the pressure side of said cyclone separator.

12. An apparatus as set forth in claim 6 wherein said guiding means on said disk comprises tube shaped portions of said disk extending from said openings in said disk.

13. An apparatus as set forth in claim 12 wherein said tube shaped portions are sloped and are pressed in said disk.

14. An apparatus as set forth in claim 6 wherein cross bars are arranged at the lower end of said housing and a post is mounted centrally on said cross bars carrying said disk, said disk being mounted adjustably on said post.

15. An apparatus as set forth in claim 14 wherein said disk is provided with a cavity and said post is tube shaped and supplies compressed air to said cavity.

16. An apparatus as set forth in claim 15 wherein oblique rails are provided upon the inside of said housing to guide the air passing therethrough.

References Cited

UNITED STATES PATENTS

| | | | |
|---|---|---|---|
| 880,242 | 2/1908 | Backhouse et al. | 209—148 |
| 957,138 | 5/1910 | Balcom | 209—150 |
| 1,977,479 | 10/1934 | Hebley et al. | 209—150 X |
| 2,233,432 | 3/1941 | Schramm | 209—150 X |
| 2,446,786 | 8/1948 | Redhead | 209—150 X |
| 2,426,946 | 9/1947 | Pfingsten et al. | 209—150 X |
| 2,729,330 | 1/1956 | Newirth | 209—150 X |
| 2,766,880 | 10/1956 | Schaub et al. | 209—150 X |
| 2,795,329 | 6/1957 | Schaub | 209—139 |

FOREIGN PATENTS

| | | |
|---|---|---|
| 202,395 | 8/1958 | Austria. |
| 872,304 | 3/1953 | Germany. |
| 6,574 of 1910 | 11/1910 | Great Britain. |
| 93,138 | 11/1958 | Norway. |

HARRY B. THORNTON, *Primary Examiner.*

TIM R. MILES, *Assistant Examiner.*